United States Patent [19]
Charvet

[11] Patent Number: 6,089,088
[45] Date of Patent: Jul. 18, 2000

[54] VIBRATING MICROGYROMETER

[75] Inventor: Pierre-Louis Charvet, St Martin le Vinoux, France

[73] Assignee: Commissariat a l'Energie Atomique, Paris, France

[21] Appl. No.: 09/183,510

[22] Filed: Oct. 30, 1998

[30] Foreign Application Priority Data

Nov. 7, 1997 [FR] France ................................ 97 14041

[51] Int. Cl.⁷ ...................................................... G01P 9/04
[52] U.S. Cl. ...................................................... 73/504.12
[58] Field of Search .......................... 73/504.12, 504.14, 73/504.13, 504.04

[56] References Cited

U.S. PATENT DOCUMENTS 3,992,952  11/1976  Hutton et al. ........................ 73/504.14
5,610,334   3/1997  Fima et al. .......................... 73/504.12

FOREIGN PATENT DOCUMENTS 0 778 458 A1  6/1997  European Pat. Off. .
44 28 405 A1  2/1996  Germany .

*Primary Examiner*—John E. Chapman
*Attorney, Agent, or Firm*—Pearne, Gordon, McCoy & Granger LLP

[57] ABSTRACT

The invention relates to a vibrating microgyrometer incorporating a seismic mass (16) placed above a surface of a substrate (15) and attached to the surface by elastic supports arranged so as to enable the seismic mass (16) to move with respect to the substrate (15) in two directions $\bar{x}$, $\bar{y}$ orthogonal to one another and orthogonal to the measurement axis of the microgyrometer. The microgyrometer also comprises excitation electrodes (40) making it possible to excite the seismic mass in the two mutually orthogonal directions and detection electrodes (41) making it possible to detect components of the Coriolis force, once again in the two mutually orthogonal directions.

16 Claims, 3 Drawing Sheets

VIBRATING MICROGYROMETER

TECHNICAL FIELD

The present invention relates to a vibrating microgyrometer and more particularly a microgyrometer micromachined on silicon.

PRIOR ART

Nowadays quartz and silicon accelerometers are commercially available as sensors and actuators. They have shown that micrometer structures are suitable for meeting existing demands as a result of their low cost and small dimensions. However, such inertial sensors are inadequate for navigation and it is now necessary to develop small sensors for measuring or obtaining information on the angular velocity or speed of a moving object of any nature. These sensors are known as gyrometers.

In connection with rotation speed information, gyroscopes are known based on the principle of maintaining the kinetic moment of a spinning wheel suspended on a gimbal assembly, which are often marvels of precision, but whose resulting very high cost does not permit their integration into numerous applications where they would appear desirable.

Other gyroscopes, known as gyrolasers, also exist. They make use of coherent optics properties and have no mobile, mechanical part.

However, there is a demand for mechanical gyrometers having a lower precision level and lower cost than the preceding gyrometers. These conditions are well satisfied by vibrating gyrometers.

The principle of their operation results from the composition of the accelerations of a solid linked with a moving frame of reference with respect to a Galilean reference system (or at least a reference system which can be considered as fixed for the duration of the experiment), from which the Coriolis force follows. This principle is well adapted to silicon or quartz microstructures and the technology used for their implementation can be likened to that used for producing microaccelerometers. Numerous gyrometers make use of this principle and frequently depend on the detection type used.

No matter what the geometry, these instruments are mechanical oscillators having two degrees of freedom orthogonal to one another, but also to the rotation axis of the angular speed to be measured, or relative to which information is required. These two degrees of freedom must also be subject to the same natural frequency or same resonant frequency, which constitutes an important constraint.

The basis for the development of these instruments is the vector expression of the Coriolis force:

$$\overline{F}_{Coriolis} = 2 \cdot m \cdot \overline{\Omega} \wedge \overline{V}_{relative} \quad [1]$$

with:
m=seismic mass linked with the moving object by means of elastic movements,
$\overline{\Omega}$=vector representation of the angular speed of the moving object,
$V_{relative}$=vector representation of the speed of the mass m relative to the moving object.

It would appear that the force $\overline{F}_{Coriolis}$ is orthogonal to the two speeds $\overline{\Omega}$ and $\overline{V}_{relative}$, and only exists if the latter are not colinear. Thus, for generating a signal proportional to $\overline{\Omega}$, it is sufficient to move a suspended mass in a direction non-colinear to $\overline{\Omega}$ by a speed $\overline{V}_{relative}$ and to measure, in the direction orthogonal to these two speeds, the signal resulting therefrom. It is important to note that the best signal will be obtained for $\overline{V}_{relative}$ perpendicular to $\overline{\Omega}$. This signal is dependent on the physical quantity which it is wished to measure at the output. Numerous designers have decided to obtain information on the rotation speed $\overline{\Omega}$ using the following amplitude ratio:

$$\frac{A_{output}}{A_{input}} = \frac{\Omega}{\pi \cdot f_0} \cdot \left[ (1-p^2)^2 + \left(\frac{p}{Q}\right)^2 \right]^{\frac{1}{2}} \quad [2]$$

with:
$\Omega$=rotation speed,
Q=mechanical quality factor,
$f_0$=natural frequency of the two directions,
$p=f/f_0$=excitation frequency/natural frequency ratio.

This amplitude ratio corresponds to that of an oscillator having two degrees of freedom, whereof one of the degrees is excited by an external force. The best ratio is obtained by exciting at the resonant frequency $f_r$:

$$\frac{A_{output}}{A_{input}} = R = \frac{\Omega \cdot Q}{\pi \cdot f_r} \quad [3]$$

The optimization of this signal amounts to improving the quality factor and minimizing the resonant frequency.

Numerous publications describe vibrating microgyrometers based on the aforementioned method. These vibrating microgyrometers are always structures having two degrees of freedom, whereof one path is restricted to one speed by means of one external excitation force and whereof the other path, excited by the Coriolis force, is used for detection. FIG. 1 is a plan view of a prior art, vibrating microgyrometer obtained by micromachining. The microgyrometer has been produced from a substrate 1 and has a moving element 2, placed above and parallel to the substrate 1. The moving element 2 is maintained above the substrate 1 by beams 3 parallel to the plane of the substrate and connected to said substrate by anchoring points 4. The moving element 2 and beams 3, whose direction is parallel to the axis y, have been obtained following the elimination of a sacrificial layer covering the substrate. The beams 3 are attached to the corners of a rectangular frame 5 of the moving element, which supports in its center a rectangular part 6 known as a secondary oscillator. The secondary oscillator is connected to the frame 5 by beams 7, whose direction is parallel to the axis x. The moving element 2, incorporating the frame 5 and secondary oscillator 6, is consequently in a plane parallel to the plane of axes x, y and perpendicular to the axis z.

This microgyrometer has capacitive excitation means by means of electrodes in the form of interdigitated transducers. The substrate 1 supports fixed, excitation electrodes 8, whilst the frame 2 supports mobile, excitation electrodes 9. The microgyrometer also has capacitive detection means through electrodes in the form of interdigitated transducers. The substrate 1 supports fixed, detection electrodes 10, whilst the secondary oscillator supports mobile, detection electrodes 11.

The microgyrometer of FIG. 1 constitutes an oscillator with two degrees of freedom, whereof one path (path $\overline{x}$) is excited by a surface variation electrostatic force. The other path (path $\overline{y}$) is used for electrostatic detection (capacitance measurement) by air gap variation. The assembly is subject to the rotation speed $\Omega$ about axis $\overline{z}$.

This type of microgyrometer suffers from the following disadvantages. It supplies a very weak signal for small rotation speeds. The ratio expressed by the relation [3] is inversely proportional to the frequency, which is disadvantageous. The response of the apparatus is not satisfactory due to the transient, vibration state.

DESCRIPTION OF THE INVENTION

In order to obviate these disadvantages, the present invention proposes a vibrating microgyrometer based on the following considerations. The Coriolis force results from the composition of the accelerations of a solid linked with a moving frame of reference with respect to a Galilean reference system (or considered as such as a result of the duration of the experiment). On using as the starting point the Coriolis force [1] interacting on an oscillator having two degrees of freedom orthogonal to one another and also to the axis of the rotation speed to be measured or on which information is desired, there is nothing to prevent imparting to the moving mass speeds in accordance with two paths constituted by the two degrees of freedom, which amounts to giving two components at the relative speed, i.e. $V_x$ and $V_y$ are said two components respectively along axes $\bar{x}$ and $\bar{y}$. It is assumed that the moving frame of reference relative to the fixed frame of reference has a rotation speed $\Omega$ about the axis $\bar{z}$. Consequently the Coriolis force will have two components $F_x$ Coriolis=$-2 \cdot m \cdot \Omega \cdot V_y$ along path $\bar{x}$ and $F_y$ Coriolis=$2 \cdot m \cdot \Omega \cdot V_x$ along the path $\bar{y}$. Therefore the amplitude along path $\bar{x}$ will be opposed by a force tending to reduce it, whereas that of path $\bar{y}$ will be increased.

If each of the two paths $\bar{x}$ and $\bar{y}$ is excited by an external, excitation force and the resultant amplitude is measured on each of the paths (the apparatus being subject to a rotation speed), the amplitude ratio R=path $\bar{x}$/path $\bar{y}$ can be brought into the form:

$$R' = \left[ \frac{16 \cdot \pi^2 \cdot f_2 \cdot \Omega^2 \cdot Q^2 - 32 \cdot \pi^3 \cdot f^3 \cdot \Omega \cdot Q + 16 \cdot \pi^4 \cdot f^4 + \Omega^4 \cdot Q^2}{16 \cdot \pi^2 \cdot f_2 \cdot \Omega^2 \cdot Q^2 + 32 \cdot \pi^3 \cdot f^3 \cdot \Omega \cdot Q + 16 \cdot \pi^4 \cdot f^4 + \Omega^4 \cdot Q^2} \right]^{\frac{1}{2}}$$

with:
f=natural frequency and resonant frequency of the paths $\bar{x}$ and $\bar{y}$,
Q=mechanical quality factor,
$\Omega$=rotation speed to be measured.

It is necessary to work in a high vacuum to obtain a high factor Q.

It would appear that for the same low rotation speed, the signal detected for an operation having two excited paths, as proposed by the invention, has a value approximately double that supplied by the prior art, vibrating gyrometers. In addition, with the oscillator evolving in steady state form, it responds instantaneously to the stress or actuation (rotation speed), which is a certain advantage.

The invention therefore relates to a vibrating microgyrometer having a seismic mass positioned above a surface of a substrate and attached to said surface by elastic means, arranged so as to enable the seismic mass to move relative to the substrate in two directions orthogonal to one another and orthogonal to the measurement axis of the microgyrometer, excitation means of the seismic mass for vibrating the same and detection means of the Coriolis force exerted on the seismic mass, characterized in that the excitation means make it possible to excite the seismic mass in said two directions orthogonal to one another and the detection means make it possible to detect the components of the Coriolis force, also in said two directions orthogonal to one another.

Advantageously, the excitation means can be electrostatic excitation means and the detection means can be capacitive detection means.

Advantageously, the elastic means are designed in such a way as to have identical mechanical stiffnesses in said two mutual orthogonal directions.

The seismic mass and the elastic means can be defined by elements produced in a plate arranged parallel to the said surface of the substrate and above said surface. Said elastic means can be flexible strips.

The excitation means can comprise electrostatic excitation capacitors, each capacitor incorporating an electrode integral with the substrate and a means forming an electrode integral with the seismic mass. The detection means can comprise capacitors, each capacitor having an electrode integral with the substrate and a means forming an electrode integral with the seismic mass. The means forming the electrode can be constituted by the material of the seismic mass if it is a conductive material. Electrodes integral with the substrate can be distributed in cavities or recesses.

Advantageously, electrostatic screens are provided, so that each electrode integral with the substrate forms a capacitor with solely one means forming an electrode integral with the seismic mass and facing the latter.

The seismic mass can be attached to the substrate by anchoring points located outside the surface occupied by the seismic mass. It can also be attached to the substrate by an anchoring point located in the center of the surface occupied by the seismic mass.

The microgyrometer according to the invention can be produced from a semiconductor substrate, e.g. a silicon substrate.

BRIEF DESCRIPTION OF THE DRAWINGS

The invention will be more readily understood and other advantages and features will become apparent from reading the following description given in non-limitative, exemplified manner, with reference to the attached drawings, wherein show.

DETAILED DESCRIPTION OF EMBODIMENTS OF THE INVENTION

Figure 1:
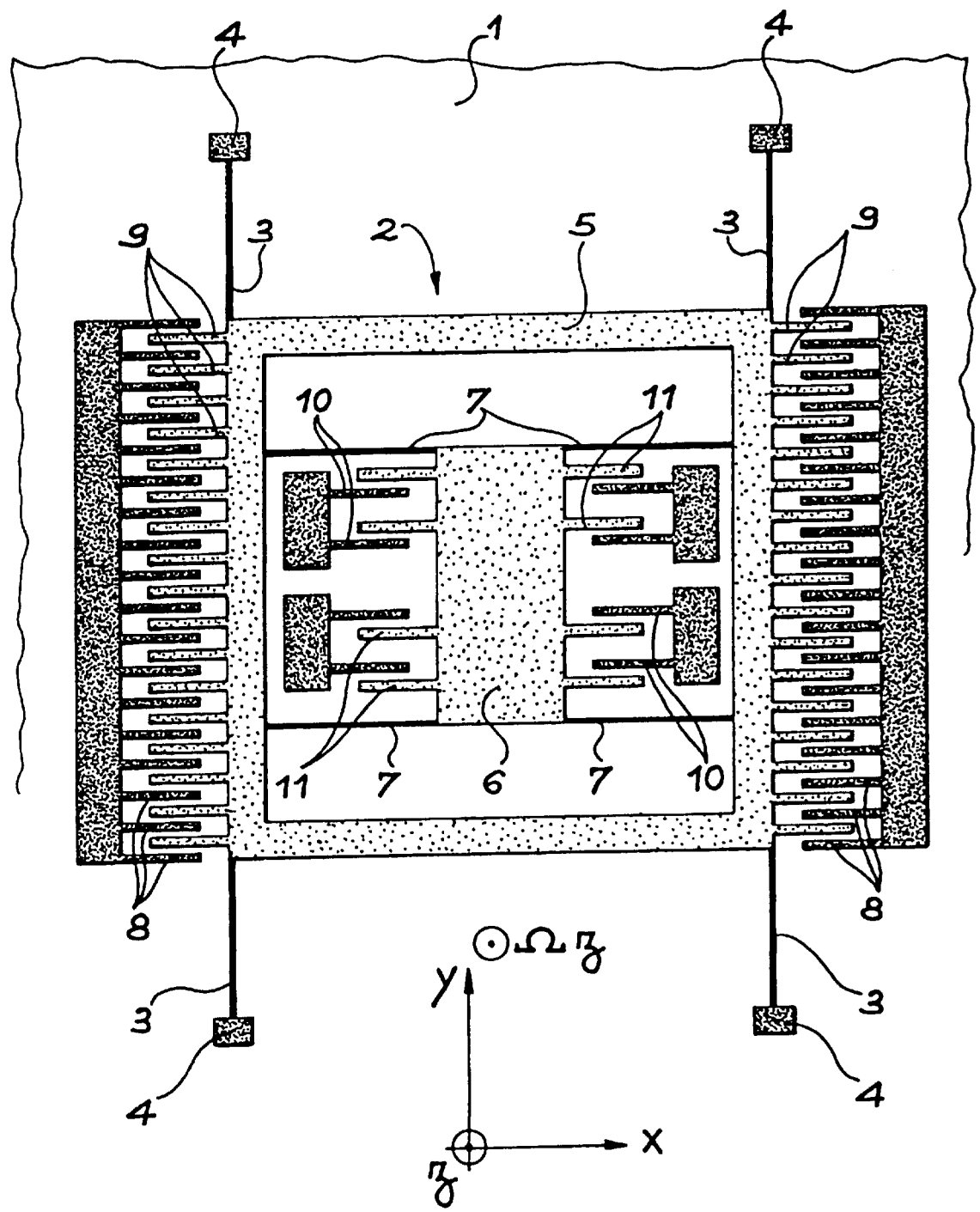
FIG. 1, already discussed, a plan view of a prior art, vibrating microgyrometer.
Figure 2:
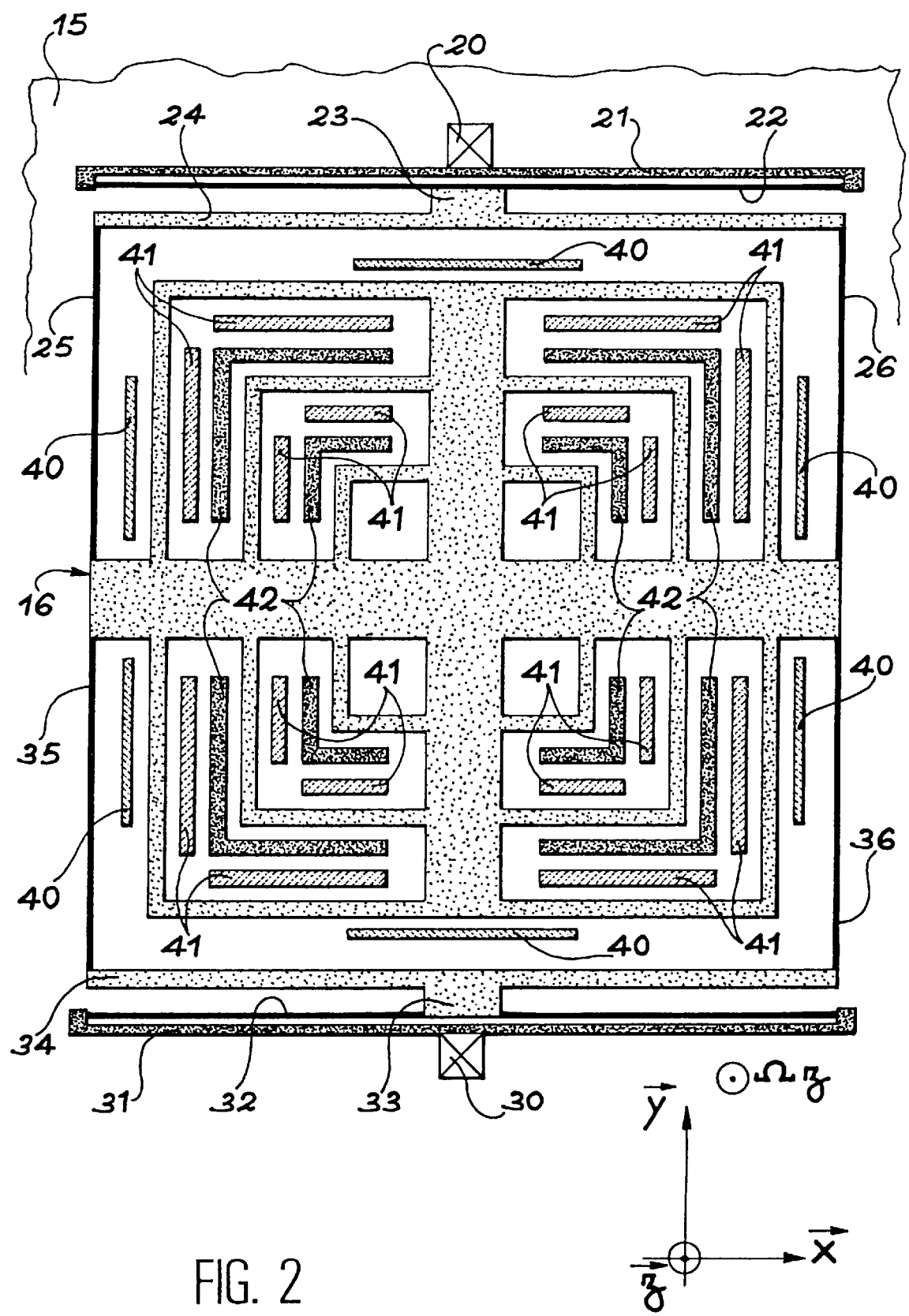
FIG. 2 a first variant, in plan view, of a microgyrometer according to the invention.

A first variant of the microgyrometer according to the present invention is shown, in plan view, in FIG. 2. This microgyrometer is micro-machined in an e.g. n-doped, monocrystalline silicon layer. This monocrystalline silicon-on-insulator layer is obtained by wafer bonding, described in numerous publications, including the article "Silicon-to-Silicon Direct Bonding Method" by M. SHIMBO et al., published in J. Appl. Phys., vol. 60 (8), 15.10.1986. It is possible to use other methods for obtaining a silicon-on-insulator layer, e.g. oxygen implantation in a silicon plate or simply depositing a monocrystalline or polycrystalline silicon layer on a sacrificial layer.

This microgyrometer comprises a seismic mass 16 suspended above the upper face of the substrate 15 and kept parallel to said face by two anchoring points 20 and 30. The anchoring points 20 and 30 maintain an etched structure in the monocrystalline silicon layer. Following the elimination of the sacrificial layer separating the monocrystalline silicon layer from the support substrate, the monocrystalline silicon layer or plate is etched to give the structure shown in FIG. 2.

Each anchoring point 20, 30 supports a beam, respectively 21 and 31, in its center. Between its ends, each beam 21, 31 subtends a flexible strip forming a spring, respectively 22, 32. The flexible strips or springs 22 and 32 are parallel to the direction $\overline{x}$. The flexible strip 22 supports in its center, by means of a transverse portion 23, a beam 24 parallel to the beam 21. In the same way, the flexible strip 32 supports in its center, by means of a transverse portion 33, a beam 34 parallel to the beam 31.

The seismic mass 16 is held at the ends of the beams 24 and 34 by four flexible strips, namely strips 25 and 26 connected to the ends of the beam 24 and strips 35, 36 connected to the ends of the beam 34. These flexible strips 25, 26, 35, 36 are parallel to the direction $\overline{y}$. Their flexibility is exerted in the direction $\overline{x}$ when the strips 22 and 32 are flexible in the direction $\overline{y}$. Thus, the seismic mass 16 can be displaced in all directions normal to the perpendicular to the upper face of the substrate 15, i.e. in all directions normal to the direction $\overline{z}$.

The elastic supports constituted by these flexible strips are designed in such a way that the mechanical stiffnesses associated therewith give the directions $\overline{x}$ and $\overline{y}$ the same natural frequency to the extent that this is possible.

In this embodiment, the seismic mass 16 is shaped like a cross, whereof each branch is connected to the adjacent branch by a series of bent portions. Each space between two successive, bent portions constitutes a recess or cavity.

Elements integral with the substrate 15 have been left during the etching of the microgyrometer. These are firstly excitation electrodes 40 distributed on the periphery of the seismic mass 16. Each electrode 40 faces a corresponding portion of the seismic mass 16 formed from doped monocrystalline silicon, i.e. electrically conductive material, which constitutes another capacitor electrode. These excitation capacitor electrodes 40 are also distributed in directions $\overline{x}$ and $\overline{y}$.

There are then other electrodes 41 known as detection electrodes. They are placed in recesses of the seismic mass 16. As for the excitation electrodes 40, each electrode 41 faces a corresponding portion of the monocrystalline silicon, seismic mass 16, which forms another capacitor electrode. The electrodes 41 are also distributed in accordance with directions $\overline{x}$ and $\overline{y}$. They are used for the measurement at all times of amplitudes along paths $\overline{x}$ and $\overline{y}$ providing information on the rotation speed about direction $\overline{z}$.

The electrodes 40 and 41 are separated from the substrate 50 by an insulator layer, e.g. a silica layer. They can be of doped monocrystalline silicon.

The microgyrometer also has electrostatic screens 42, e.g. of monocrystalline silicon and directly supported by the substrate 15. These electrostatic screens 42 are distributed as a function of the distribution of the detection electrodes 41, so that each electrode 41 only forms a single capacitor with part of the facing seismic mass 16. Thus, each of the electrodes 40 and 41 only has one influence direction.

The excitation electrodes 40 make it possible to apply an excitation signal along paths $\overline{x}$ and $\overline{y}$. The detection electrodes 41 make it possible to collect a signal along paths $\overline{x}$ and $\overline{y}$ in order to transmit it to an analyzer, which will provide information on the rotation speed about the axis $\overline{z}$ of a body equipped with the microgyrometer. Amplitude-locking of the microgyrometer is desirable, which makes it possible not to modify the mechanical characteristics as a function of the rotation speed. Therefore information on said speed will be provided by the knowledge of the electrostatic potentials applied to the excitation electrodes.

Figure 3:
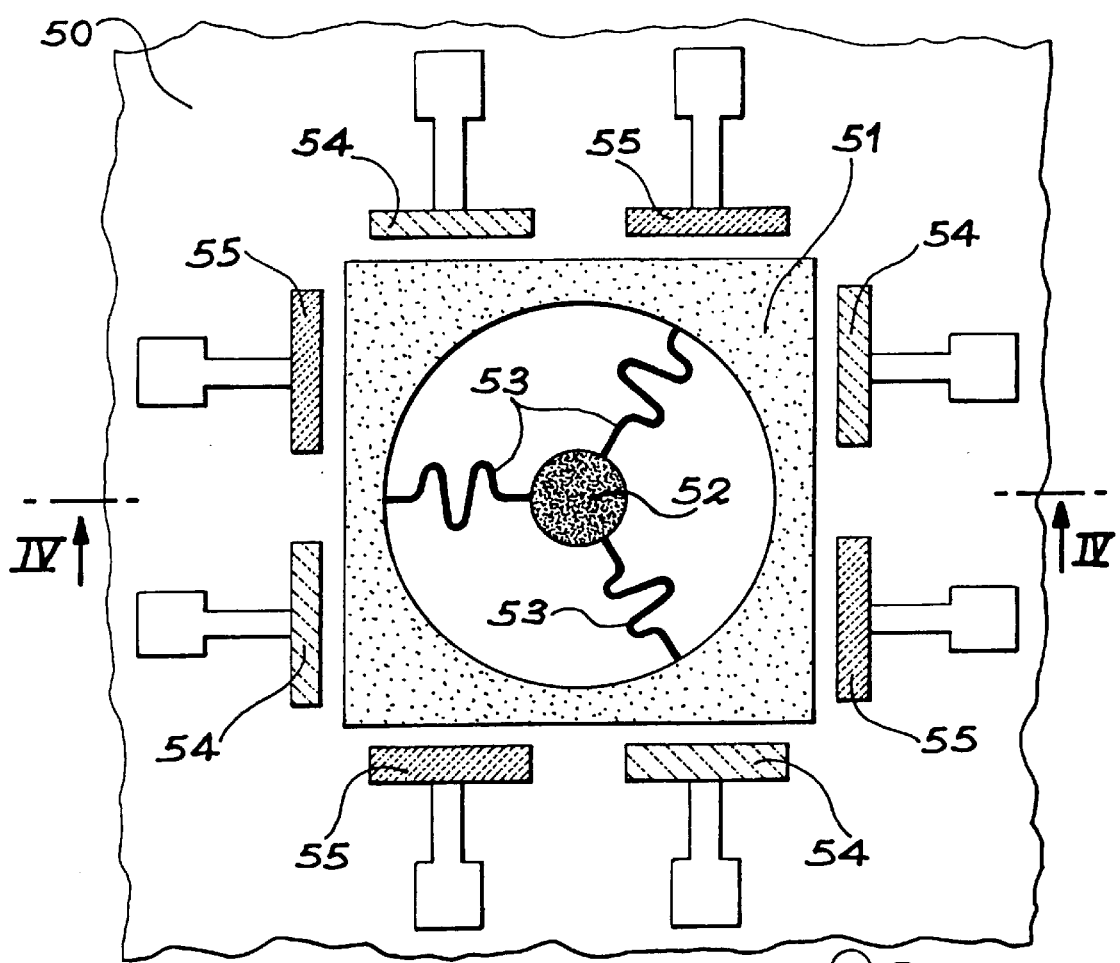
FIG. 3 a second variant, in plan view, of a microgyrometer according to the invention.
Figure 4:
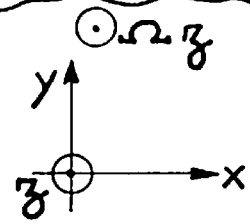
FIG. 4 a sectional view along axis IV—IV of FIG. 3.
Figure 4:
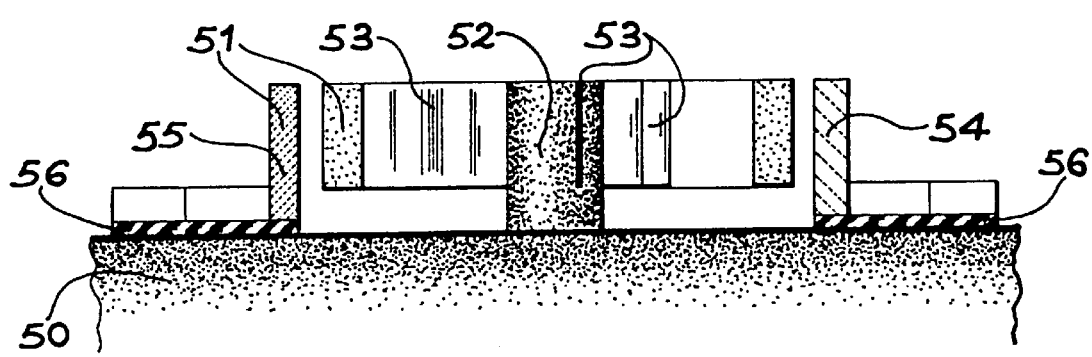

A second microgyrometer variant according to the invention is illustrated in FIGS. 3 and 4, FIG. 3 being a plan view and FIG. 4 a sectional side view. This microgyrometer is micromachined on an e.g. n-doped silicon substrate 50. It comprises a seismic mass 51 suspended above the upper face of the substrate 50 and parallel to said face, by a central anchoring point 52 using elastic supports 53. As for the first variant, the vibrating structure can be etched in a plate obtained by depositing a n-doped monocrystalline silicon on a sacrificial layer deposited beforehand on the upper face of the substrate.

The elastic supports 53 are flexible strips etched at the same time as the seismic mass 51. They are distributed in such a way that the excitation of the seismic mass takes place uniformly in all directions of the plane defined by the axes $\overline{x}$ and $\overline{y}$.

Etching has left other elements integral with the substrate 50, namely excitation electrodes 54 and detection electrodes 55. These electrodes are distributed in alternating manner about the seismic mass. Each electrode 54 or 55 faces a corresponding portion of the seismic mass 51 and which constitutes another capacitor electrode. The electrodes 54 and 55 are worked over relative to the substrate 50 by an insulating layer 56, e.g. a silica layer.

As for the previous variant, the excitation electrodes 55 make it possible to apply an excitation signal along paths $\overline{x}$ and $\overline{y}$. The detection electrodes 55 make it possible to collect a signal along paths $\overline{x}$ and $\overline{y}$ in order to transmit it to an analyzer, which will provide information on the rotation speed about the axis $\overline{z}$ of a body equipped with the microgyrometer.

For a microgyrometer according to the present invention, the detected signal is, for the same low rotation speed, approximately twice that detected by the prior art, vibrating microgyrometers. Moreover, as the oscillator evolves in steady state form, it is able to respond instantaneously to the stress or action constituted by a rotation speed.

The scope of the invention covers the use of means of excitation other than those described, e.g. piezoelectric excitation means.

I claim:

1. Vibrating microgyrometer having a seismic mass positioned above a surface of a substrate and attached to said surface by elastic means, arranged so as to enable the seismic mass to move relative to the substrate in two directions ($\overline{x}$, $\overline{y}$) orthogonal to one another and orthogonal to the measurement axis of the microgyrometer, excitation means of the seismic mass for vibrating the same and detection means of the Coriolis force exerted on the seismic mass, wherein the excitation means make it possible to excite the seismic mass in said two directions orthogonal to one another and the detection means make it possible to detect the components of the Coriolis force, also in said two directions orthogonal to one another.

2. Microgyrometer according to claim 1, wherein the excitation means are electrostatic excitation means.

3. Microgyrometer according to claim 1, wherein the detection means are capacitive detection means.

4. Microgyrometer according to claim 1, wherein the elastic means are designed so as to have identical mechanical stiffnesses in said two mutually orthogonal directions.

5. Microgyrometer according to claim 1, wherein the seismic mass and elastic means are defined by recesses made in a plate positioned parallel to said surface of the substrate and above said surface.

6. Microgyrometer according to claim 5, wherein the elastic means are flexible means.

7. Microgyrometer according to claim 5, wherein the excitation means comprise electrostatic excitation capacitors, each capacitor having an electrode integral with the substrate and a means forming an electrode integral with the seismic mass.

8. Microgyrometer according to claim 7, wherein the means forming the electrode is constituted by the material of the seismic mass, which is a conductive material.

9. Microgyrometer according to claim 7, wherein the electrodes integral with the substrate are distributed in said recesses.

10. Microgyrometer according to claim 5, wherein the detection means comprise capacitors, each capacitor comprising an electrode integral with the substrate and a means forming an electrode integral with the seismic mass.

11. Microgyrometer according to claim 10, wherein the means forming the electrode is constituted by the material of the seismic mass, which is a conductive material.

12. Microgyrometer according to claim 10, wherein the electrodes integral with the substrate are distributed in said recesses.

13. Microgyrometer according to claim 12, wherein there are electrostatic screens, so that each electrode integral with the substrate forms a capacitor with solely one means forming an electrode integral with the seismic mass and facing the same.

14. Microgyrometer according to claim 1, wherein the seismic mass is attached to the substrate by anchoring points located outside the surface occupied by the seismic mass.

15. Microgyrometer according to claim 1, wherein the seismic mass is attached to the substrate by an anchoring point located in the center of the surface occupied by the seismic mass.

16. Microgyrometer according to claim 1, produced from a semiconductor substrate.

* * * * *